G. S. ENGLE.
PROCESS OF PRODUCING A DOUBLE COPPER OXID PLATE.
APPLICATION FILED OCT. 8, 1912.
1,356,197.
Patented Oct. 19, 1920.
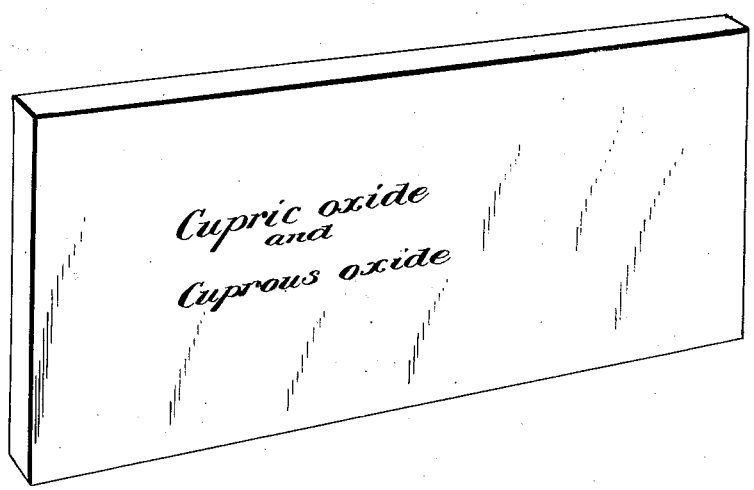
Witnesses:
Inventor
George S. Engle
by
James L. Norris,
Atty.

UNITED STATES PATENT OFFICE.

GEORGE S. ENGLE, OF CRANSTON, RHODE ISLAND, ASSIGNOR TO AMERICAN ELEMENTARY ELECTRIC COMPANY, OF WASHINGTON, DISTRICT OF COLUMBIA, A CORPORATION OF DISTRICT OF COLUMBIA.

PROCESS OF PRODUCING A DOUBLE-COPPER-OXID PLATE.

1,356,197. Specification of Letters Patent. Patented Oct. 19, 1920.

Application filed October 8, 1912. Serial No. 724,606.

*To all whom it may concern:*

Be it known that I, GEORGE S. ENGLE, a citizen of the United States, residing at Cranston, in the county of Providence and State of Rhode Island, have invented new and useful Improvements in Processes of Producing a Double-Copper-Oxid Plate, of which the following is a specification.

This invention relates to a double copper oxid plate for use in primary batteries and other purposes, and also to a process for producing the same, and the primary objects of the invention are to provide a double copper oxid plate embodying in the main cupric oxid and a minimized quantity of cuprous oxid to form a battery element which will start electrolytic action without short circuiting or reducing the surface to cuprous oxid, and also to produce a more durable and lasting element.

The drawing illustrates a perspective view of one form of the article or plate.

In carrying out the process, a bar of copper is heated to such temperature that when sprayed with water blisters will be formed on the surface thereof. These blisters are then scraped off the bar in the form of copper flakes which are mainly black oxid of copper or cupric oxid containing some pure metallic copper. These flakes are then suitably treated to eliminate any unctious matter therefrom such as oleaginous or greasy substances by boiling the flakes in hot water, which latter step may be pursued without in the least affecting or changing the desirable black oxid of copper properties of the flakes.

A binder is next prepared and consists of sugar refined and clarified by bone black and free of ultra marine blue, dissolved in water brought to the boiling point in the proportion of two parts sugar to one part of water. The flakes are thoroughly mixed with this binder and then pressed into compact form and shape by any suitable means and placed in a curing oven and subjected to heat. During this curing action the binder melts at 365° F.; between 400° and 420° F., the binder loses two molecules of water and is converted into caramel, a very thick and black liquor. At a still higher temperature the binder yields combustible gases, etc., and the remaining portion or residuum is one-fourth of its weight and in the form of charcoal. The heat of the curing oven is carried up to 500° F.

The plate in the condition just specified is next placed in a baking oven where the temperature is about 1200° F. In this baking oven the charcoal residue of the binder completely burns out without the least final residue, and the metallic copper is changed to cuprous oxid by the said high degree of heat. While the plate or product thus treated is red with heat it is immediately put into a suitable press and compressed or forced into a hard, dense and strong mass of black oxid of copper and cuprous oxid. The plate or compressed mass is then taken from the press and allowed to cool in the air.

As hereinbefore stated, the resultant plate produced as explained will be found materially advantageous for the particular purpose for which it has been devised, as it will start electrolytic action without short circuiting or reducing the surface to cuprous oxid and has a longer and more durable practical service than other plates having binders which cannot be wholly eliminated by heat and other means.

What is claimed is:

1. The process of producing a copper oxid electric battery element, consisting in forming flakes of black or cupric oxid of copper carrying therewith portions of unoxidized copper and treating the said flakes to eliminate any unctuous matter therefrom, thoroughly mixing the flakes carrying the portions of unoxidized copper with a binder and pressing the mass thus produced into a desired shape so that the black or cupric oxid of copper and portions of metallic copper will be regularly distributed throughout the body of the pressed mass, then subjecting the compressed mass to the action of heat until the compressed mass is cured and the binder reduced to a minimized residuum, then placing the compressed mass carrying the minimized residuum of the binder in the oven and subjecting the said mass to a high degree of heat to first burn out the binder residuum and next to change the metallic copper within the body of the mass to cuprous oxid, removing the mass now composed of cupric and cuprous oxids of copper from the baking oven and again compressing the same while red with heat, and finally allowing the plate to cool in the air.

2. The process of producing a copper oxid electric battery element, consisting in first preparing and binding a mass of flakes of black oxid of copper carrying portions of metallic copper distributed through the mass with the black oxid flakes, subjecting the mass to the action of the preliminary degree of heat to reduce the binder to a minimized residuum, then subjecting the mass with the minimized residuum of the binder to a much higher degree of heat to first entirely eliminate the binder residuum and then to change the metallic copper to red oxid which is thoroughly intermingled with the black oxid in the mass, compressing the mass while at a red heat, and finally allowing the compact mass to cool.

In testimony whereof I have hereunto set my hand in presence of two subscribing witnesses.

GEORGE S. ENGLE.

Witnesses:
CHAS. S. HYER,
CHAS. A. ROWE.